(12) United States Patent　　(10) Patent No.: US 7,457,797 B2
Bestgen et al.　　(45) Date of Patent: Nov. 25, 2008

(54) METHOD AND APPARATUS FOR ASSOCIATING LOGICAL CONDITIONS WITH THE RE-USE OF A DATABASE QUERY EXECUTION STRATEGY

(75) Inventors: Robert Joseph Bestgen, Dodge Center, MN (US); Carol Ledermann Ramler, Rochester, MN (US); Jeffrey Wayne Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 11/094,655

(22) Filed: Mar. 30, 2005

(65) Prior Publication Data

US 2006/0224561 A1　　Oct. 5, 2006

(51) Int. Cl.
*G06F 17/30* (2006.01)
(52) U.S. Cl. .............................. 707/2; 707/3; 707/102; 707/100
(58) Field of Classification Search .................. None
See application file for complete search history.

(56) References Cited

U.S. PATENT DOCUMENTS

| | | | | |
|---|---|---|---|---|
| 6,112,209 | A * | 8/2000 | Gusack | 707/101 |
| 6,466,931 | B1 * | 10/2002 | Attaluri et al. | 707/2 |
| 6,898,588 | B2 * | 5/2005 | Kosciuszko et al. | 707/2 |
| 2004/0006563 | A1 * | 1/2004 | Zwiegincew et al. | 707/10 |
| 2004/0093332 | A1 * | 5/2004 | Hrle | 707/3 |

OTHER PUBLICATIONS

U.S. Appl. No. 10/688,951, "Method and System for Reducing Host Variable Impact On Access Path Selection," filed Oct. 21, 2003 by Namik Hrle.
U.S. Appl. No. 10/955,737, "Method and Apparatus for Re-Evaluating Execution Strategy for a Database Query," filed Sep. 30, 2004 by Paul R. Day et al.

* cited by examiner

*Primary Examiner*—Cam-Y Truong
*Assistant Examiner*—Shyue Jiunn Hwa
(74) *Attorney, Agent, or Firm*—Roy W. Truelson

(57) ABSTRACT

A query facility for database queries saves and re-uses query execution strategies, and automatically determines whether a strategy can be re-used when an imported variable changes. The query facility automatically saves one or more logical conditions associated with the one or more imported variables in the query. When the query is reused, the logical conditions are evaluated using the imported variable values, and the previously saved execution strategy is used only if the condition or conditions are met. Preferably, the logical conditions express a range of imported variable values which are included in a database subset data structure used by the saved query execution strategy, such as a materialized query table or partitioned table. Logical conditions are preferably generated by negating the predicates from a logical expression defining the applicability of the execution strategy, inserting the negated predicates into the query, and performing a transitive closure.

12 Claims, 6 Drawing Sheets

METHOD AND APPARATUS FOR ASSOCIATING LOGICAL CONDITIONS WITH THE RE-USE OF A DATABASE QUERY EXECUTION STRATEGY

FIELD OF THE INVENTION

The present invention relates generally to digital data processing, and more particularly to the generation and execution of database queries in a digital computer system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises hardware in the form of one or more central processing units (CPU) for processing instructions, memory for storing instructions and other data, and other supporting hardware necessary to transfer information, communicate with the external world, and so forth. From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

The overall speed at which a computer system performs day-to-day tasks (also called "throughput") can be increased by making various improvements to the computer's hardware design, which in one way or another increase the average number of simple operations performed per unit of time. The overall speed of the system can also be increased by making algorithmic improvements to the system design, and particularly, to the design of software executing on the system. Unlike most hardware improvements, many algorithmic improvements to software increase the throughput not by increasing the average number of operations executed per unit time, but by reducing the total number of operations which must be executed to perform a given task.

Complex systems may be used to support a variety of applications, but one common use is the maintenance of large databases, from which information may be obtained. Large databases usually support some form of database query for obtaining information which is extracted from selected database fields and records. Such queries can consume significant system resources, particularly processor resources, and the speed at which queries are performed can have a substantial influence on the overall system throughput.

Conceptually, a database may be viewed as one or more tables of information, each table having a large number of entries (analogous to rows of a table), each entry having multiple respective data fields (analogous to columns of the table). The function of a database query is to find all rows, for which the data in the columns of the row matches some set of parameters defined by the query. A query may be as simple as matching a single column field to a specified value, but is often far more complex, involving multiple field values and logical conditions. A query may also involve multiple tables (referred to as a "join" query), in which the query finds all sets of N rows, one row from each respective one of N tables joined by the query, where the data from the columns of the N rows matches some set of query parameters.

Execution of a query involves retrieving and examining records in the database according to some search strategy. For any given logical query, not all search strategies are equal. Various factors may affect the choice of optimum search strategy. One of the factors affecting choice of optimum search strategy is the sequential order in which multiple conditions joined by a logical operator, such as AND or OR, are evaluated. The sequential order of evaluation is significant because the first evaluated condition is evaluated with respect to all the entries in a database table, but a later evaluated condition need only be evaluated with respect to some subset of records which were not eliminated from the determination earlier. Therefore, as a general rule, it is desirable to evaluate those conditions which are most selective (i.e., eliminate the largest number of records from further consideration) first, and to evaluate conditions which are less selective later.

Other factors can also affect the choice of optimum execution strategy. For example, certain auxiliary database structures may, if appropriately used, provide shortcuts for evaluating a query. One well known type of auxiliary database structure is an index. An index is conceptually a sorting of entries in a database table according to the value of one or more corresponding fields (columns). For example, if the database table contains entries about people, one of the fields may contain a birthdate, and a corresponding index contains a sorting of the records by birthdate. If a query requests the records of all persons born before a particular date, the sorted index is used to find the responsive entries, without the need to examine each and every entry to determine whether there is a match. A well-designed database typically contains a respective index for each field having an ordered value which is likely to be used in queries.

Another type of auxiliary database record used in some databases is a materialized query table. A materialized query table is conceptually a database subset data structure defined by a query, the subset containing all entries from a database table (or sets of entries from multiple database tables) which satisfy the defining query. Where a query includes the conditions of the query defining the materialized query table or logically requires a subset of the entries in the materialized query table, it may be advantageous to refer to the materialized query table in determining those entries which satisfy the query.

Some databases also employ partitioned tables, which can be used to advantage in evaluating certain queries. A partitioned table is simply a portion of a larger conceptual database table. For any of various reasons, the number of entries in the database table may be so large that it is deemed desirable to divide the table into multiple "partitioned" tables, each entry being allocated to a respective one of the partitioned tables. If the logical conditions of a query are such that it can be known that all entries satisfying the query will be contained in one of the partitioned tables, then it is not necessary to examine entries in the other partitioned tables, resulting in a considerable savings at query execution time.

To support database queries, large databases typically include a query engine which executes the queries according to some automatically selected search strategy, using the known characteristics of the database and other factors. Some large database applications further have query optimizers which construct search strategies, and save the query and its corresponding search strategy for reuse. These strategies may include, among other things, whether an auxiliary data structure such as an index or materialized query table will be used. Because it is anticipated that a search strategy constructed by a query optimizer may be re-used many times, the query optimizer may be justified in using very complex and sophisticated technique to determine an optimum query strategy. These techniques themselves may involve considerable overhead, much like compiling and optimizing an executable program involves overhead, but the overhead of optimizing a query can be outweighed by the improved efficiency of a query which is executed multiple times.

A re-usable query may include one or more imported variable values ("host variables") in its logical conditions. I.e., where the query compares a field of each database record to some value, the query may be written so that the compared-to value is a variable, to be provided ("imported") when the query is invoked for execution. In this manner, the same query can be re-used for multiple possible compared-to values, without the necessity of writing and maintaining separate queries for all possible compared-to values.

A query optimizer or similar function may generate and save a search strategy for a query based on certain assumptions about the use of auxiliary data structures or the number of entries eliminated from consideration by certain logical conditions. Since the range of entries eliminated by the indexed value will depend on the value of the variable to which it is compared, this range could vary considerably for different executions of the same query if the query contains imported variables. A query strategy which is optimized using one variable value will not necessarily be optimal using a different query strategy.

This problem can be particularly acute if a search strategy optimized for a particular variable value uses certain auxiliary data structures or partitioned tables. For example, if a search strategy uses a materialized query table or a partitioned table because the originally optimized query involves some subset of the table, a change in the variable value may cause the responsive subset to include values outside the materialized query table or partitioned table, which could result in significantly different execution performance or incorrect results.

It would be possible to simply re-optimize a query every time it is executed, but this involves considerable overhead. If intelligent determinations could be made to automatically re-evaluate the execution strategies of queries under certain conditions, particularly where the query involves imported variables which affects the range of records in a materialized query table, partitioned table, or similar subset of the database, the execution performance of such queries could be improved. A need therefore exists, not necessarily recognized, for an improved database query engine or optimizer which can automatically make intelligent choices in determining when to re-evaluate the execution strategies of certain queries.

SUMMARY OF THE INVENTION

A query engine (or optimizer) which supports database queries saves and re-uses query execution strategies. If the query contains one or more imported variables, the query engine (or optimizer) automatically saves one or more logical conditions associated with the one or more imported variables in the query. When the query is reused, the logical conditions are evaluated using the imported variable values, and the previously saved execution strategy is used only if the condition or conditions are met.

In accordance with one aspect of the preferred embodiment, the logical conditions express a range of imported variable values which are included in a database subset data structure which is used by the saved query execution strategy. A database subset data structure could be a materialized query table, a partitioned table, or some other subset of a database which would narrow the range of entries to be examined by a search engine. The saved query execution strategy is thus optimally used when all the responsive entries will be contained in the database subset data structure. If, for a particular query, the logical condition is not met (indicating that some responsive entries might not be contained in the database subset data structure), then the previously saved execution strategy is not used for the query.

In accordance with another aspect of the preferred embodiment, one or more logical conditions associated with an imported variable are obtained by a process of obtaining a logical expression defining the applicability of the execution strategy, negating the predicates from the logical expression defining the applicability of the execution strategy, inserting the negated predicates into the query, and performing a transitive closure.

By associating logical conditions with a saved query execution strategy as disclosed herein, it is possible to determine, with very little overhead, whether a new instance of the query using one or more different imported variable values can efficiently be executed using the previously saved execution strategy, and avoid either excessive re-optimization of a query or use of a query execution strategy which is inappropriate for the imported variable values selected.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
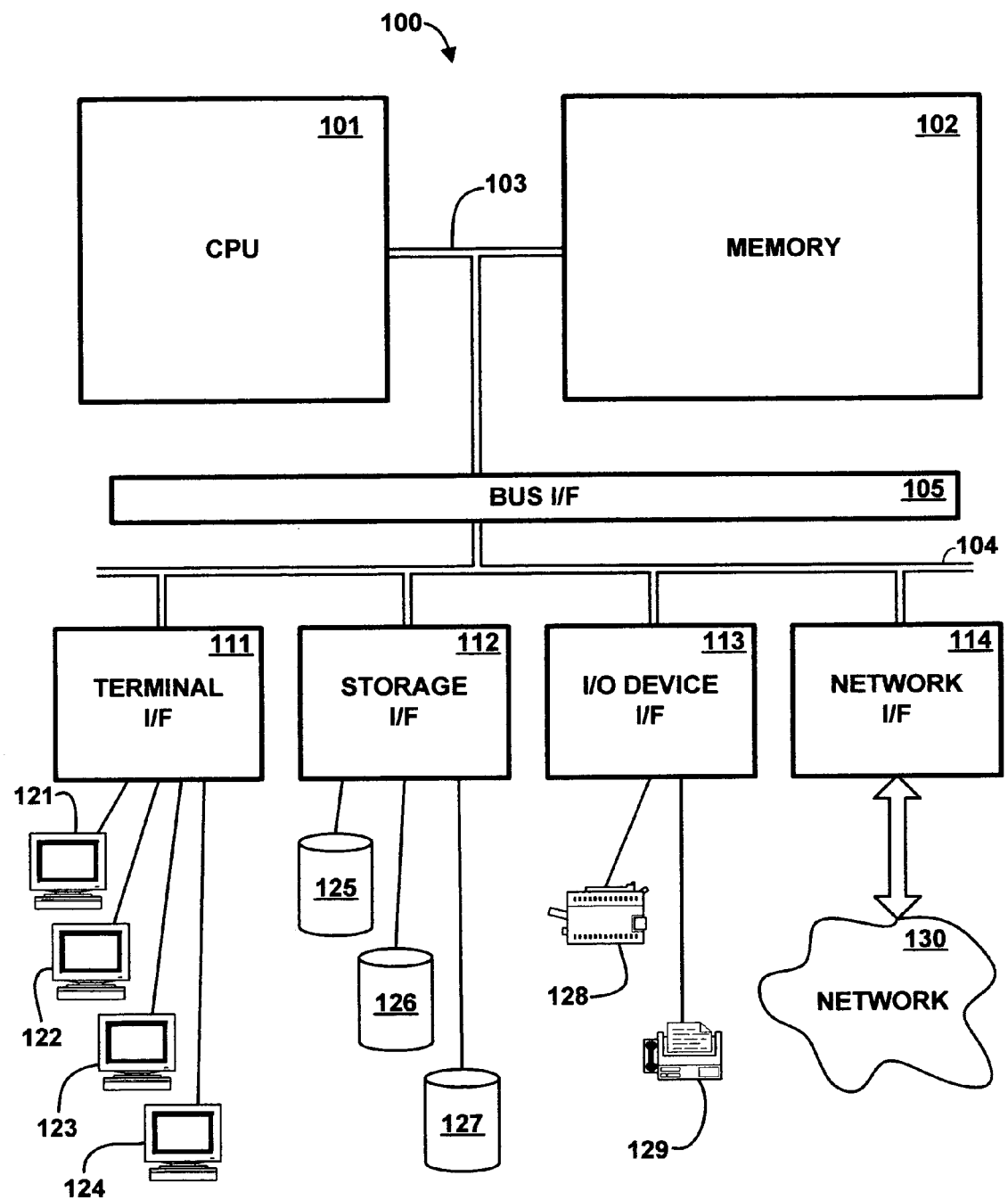
FIG. 1 is a high-level block diagram of the major hardware components of a computer system for executing database queries and determining whether to re-use query execution strategies, according to the preferred embodiment of the present invention.

Referring to the Drawing, wherein like numbers denote like parts throughout the several views, FIG. 1 is a high-level representation of the major hardware components of a computer system 100 for use in generating and executing database queries, optimizing query strategies, and determining whether to re-use a previously optimized execution strategy, according to the preferred embodiment of the present invention. CPU 101 is a general-purpose programmable processor which executes instructions and processes data from main memory 102. Main memory 102 is preferably a random access memory using any of various memory technologies, in which data is loaded from storage or otherwise for processing by CPU 101.

Memory bus 103 provides a data communication path for transferring data among CPU 101, main memory 102 and I/O bus interface unit 105. I/O bus interface 105 is further coupled to system I/O bus 104 for transferring data to and from various I/O units. I/O bus interface 105 communicates with multiple I/O interface units 111-114, which may also be known as I/O processors (IOPs) or I/O adapters (IOAs), through system I/O bus 104. System I/O bus may be, e.g., an industry standard PCI bus, or any other appropriate bus technology. The I/O interface units support communication with a variety of storage and I/O devices. For example, terminal interface unit 111 supports the attachment of one or more user terminals 121-124. Storage interface unit 112 supports the attachment of one or more direct access storage devices (DASD) 125-127 (which are typically rotating magnetic disk drive storage devices, although they could alternatively be other devices, including arrays of disk drives configured to appear as a single large storage device to a host). I/O device interface unit 113 supports the attachment of any of various other types of I/O devices, such as printer 128 and fax machine 129, it being understood that other or additional types of I/O devices could be used. Network interface 114 supports a connection to an external network 130 for communication with one or more other digital devices. Network 130 may be any of various local or wide area networks known in the art. For example, network 130 may be an Ethernet local area network, or it may be the Internet. Additionally, network interface 114 might support connection to multiple networks.

It should be understood that FIG. 1 is intended to depict the representative major components of system 100 at a high level, that individual components may have greater complexity than represented in FIG. 1, that components other than or in addition to those shown in FIG. 1 may be present, and that the number, type and configuration of such components may vary, and that a large computer system will typically have more components than represented in FIG. 1. Several particular examples of such additional complexity or additional variations are disclosed herein, it being understood that these are by way of example only and are not necessarily the only such variations.

Although only a single CPU 101 is shown for illustrative purposes in FIG. 1, computer system 100 may contain multiple CPUs, as is known in the art. Although main memory 102 is shown in FIG. 1 as a single monolithic entity, memory 102 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although memory bus 103 is shown in FIG. 1 as a relatively simple, single bus structure providing a direct communication path among CPU 101, main memory 102 and I/O bus interface 105, in fact memory bus 103 may comprise multiple different buses or communication paths, which may be arranged in any of various forms, such as point-to-point links in hierarchical, star or web configurations, multiple hierarchical buses, parallel and redundant paths, etc. Furthermore, while I/O bus interface 105 and I/O bus 104 are shown as single respective units, system 100 may in fact contain multiple I/O bus interface units 105 and/or multiple I/O buses 104. While multiple I/O interface units are shown which separate a system I/O bus 104 from various communications paths running to the various I/O devices, it would alternatively be possible to connect some or all of the I/O devices directly to one or more system I/O buses.

Computer system 100 depicted in FIG. 1 has multiple attached terminals 121-124, such as might be typical of a multi-user "mainframe" computer system. Typically, in such a case the actual number of attached devices is greater than those shown in FIG. 1, although the present invention is not limited to systems of any particular size. User workstations or terminals which access computer system 100 might also be attached to and communicate with system 100 over network 130. Computer system 100 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems.

While various system components have been described and shown at a high level, it should be understood that a typical computer system contains many other components not shown, which are not essential to an understanding of the present invention. In the preferred embodiment, computer system 100 is a computer system based on the IBM AS/400™ or i/Series™ architecture, it being understood that the present invention could be implemented on other computer systems.

Figure 2:
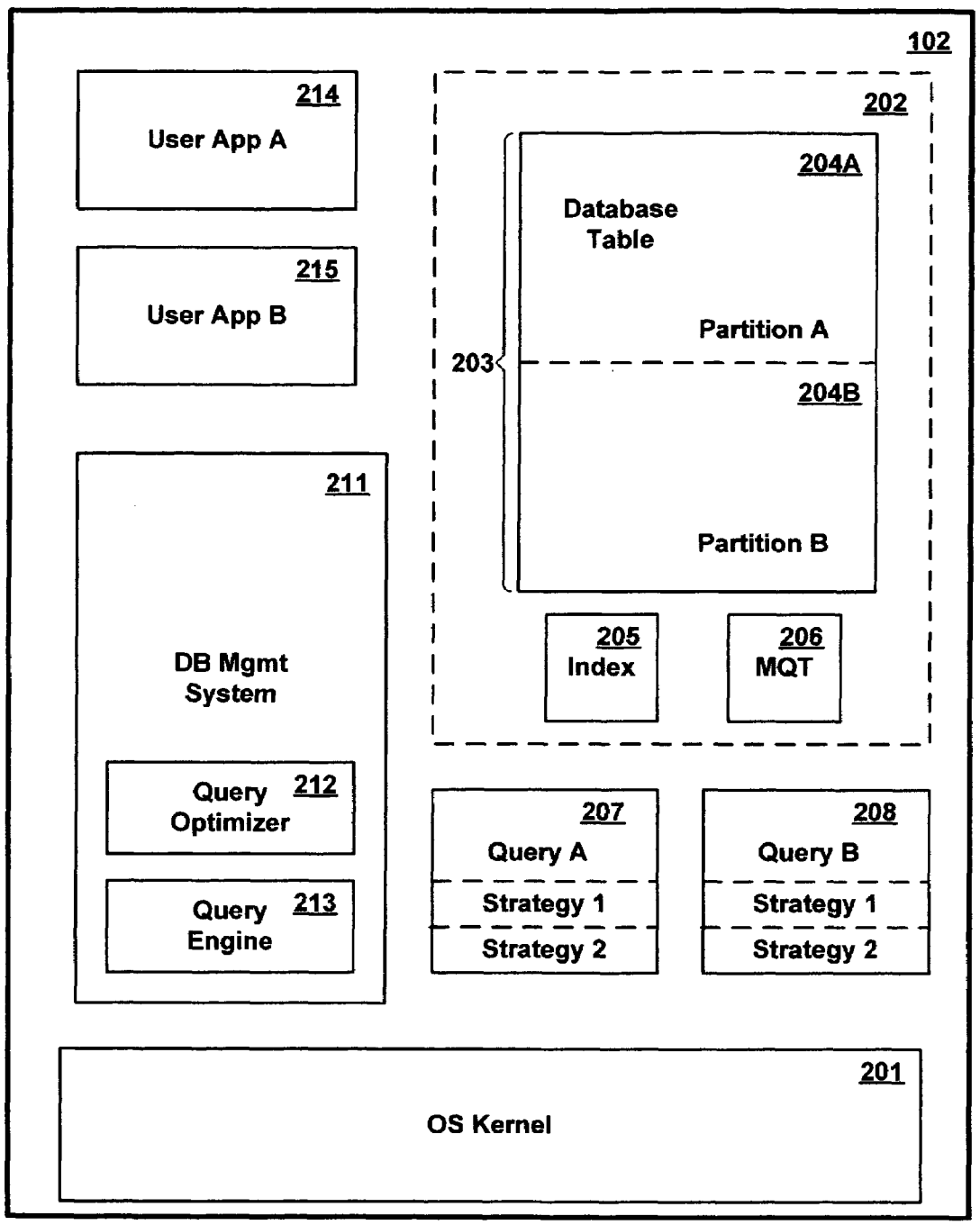
FIG. 2 is a conceptual illustration of the major software components of a computer system for executing database queries and determining whether to re-use query execution strategies, according to the preferred embodiment.

FIG. 2 is a conceptual illustration of the major software components of system 100 in memory 102. Operating system 201 provides various low-level software functions, such as device interfaces, management of memory pages, management and dispatching of multiple tasks, etc. as is well-known in the art. A structured database 202 contains data which is maintained by computer system 100 and for which the system provides access to one or more users, who may be directly attached to system 100 or may be remote clients who access system 100 through a network using a client/server access protocol. Database 202 contains one or more tables 203 (of which one is shown in FIG. 2), each having a plurality of entries or records, each entry containing at least one (and usually many) fields, as is well known in the art. Database table 203 might contain almost any type of data which is provided to users by a computer system. As shown in FIG. 2, database table 203 comprises two partitions or partitioned tables 204A, 204B (herein generically referred to as feature 204), each partition containing some discrete portion of the entries in table 203. Associated with database 202 are one or more database indexes 205 (of which one is shown in FIG. 2), each index representing an ordering of records in database 202 according to some specified criterion. Also associated with database 202 are one or more materialized query tables (MQT) 206 (of which one is shown in FIG. 2), each MQT representing a subset of database records logically defined by a query. Although one database 202, one database table 203 (having two partitions 204), one index 205 and one MQT 206 are shown in FIG. 2, the number of such entities may vary, and could be much larger. The computer system may contain multiple databases, each database may contain multiple tables, each table may have more than two partitions, and each database may have associated with it multiple indexes or MQT's. Alternatively, some entities represented in FIG. 2 might not be present in all databases; for example, some database tables are not partitioned, or the database might not contain materialized query tables or the like. Additionally, database 202 on system 100 may be logically part of a larger distributed database which is stored on multiple computer systems.

Database management system 211 provides basic functions for the management of database 202. Database management system 211 may theoretically support an arbitrary number of databases, although only one is shown in FIG. 2. Database management system 211 preferably allows users to perform basic database operations, such as defining a database, altering the definition of the database, creating, editing and removing records in the database, viewing records in the database, defining database indexes, and so forth. Among the functions supported by database management system 211 is the making of queries against data in database 202. Query support functions in database management system 211 include query optimizer 212 and query engine 213. Database management system 211 may further contain any of various more advanced database functions. Although database management system 211 is represented in FIG. 2 as an entity separate from operating system kernel 201, it will be understood that in some computer architectures various database management functions are integrated with the operating system.

Query optimizer 212 generates query execution strategies for performing database queries. As is known in the database art, the amount of time or resource required to perform a complex query on a large database can vary greatly, depending on various factors, such as the availability of an index or other auxiliary data structure, the amount of resources required to evaluate each condition, and the expected selectivity (i.e., number of records eliminated from consideration) of the various logical conditions. Optimizer 212 determines an optimal execution strategy according to any optimizing algorithm, now known or hereafter developed, and generates an execution strategy, also known as an "access plan", according to the determination. The execution strategy is a defined series of steps for performing the query, and thus is, in effect, a computer program. The optimizer 212 which generates the execution strategy performs a function analogous to that of a compiler, although the execution strategy data is not necessarily executable-level code. It is, rather, a higher-level series of statements which are interpreted and executed by query engine 213.

A query can be saved as a persistent storage object in memory, and can be written to disk or other storage. Once created by optimizer 212, a query execution strategy can be saved with the query as part of the persistent storage object. For a given query, it is possible to generate and save one or multiple optimized execution strategies. The query can be invoked, and a saved query strategy re-used (re-executed), many times.

FIG. 2 represents persistent storage objects Query A 207 and Query B 208. Query objects are described in further detail herein, with respect to FIG. 4. Although two query objects, each containing two execution strategies, are represented for illustrative purposes in FIG. 2, it will be understood that the actual number of such entities may vary, that typically a large computer system contains a much larger number of query objects, that each query object may contain or be associated with zero, one, two, or more than two execution strategies. Although these are referred to herein as "query objects", the use of the term "object" is not meant to imply that database management system 211 or other components are necessarily programmed using so-called object-oriented programming techniques, or that the query object necessarily has the attributes of an object in an object-oriented programming environment, although it would be possible to implement them using object-oriented programming constructs.

In addition to database management system 211, one or more user applications 214, 215 executing on CPU 101 may access data in database 202 to perform tasks on behalf of one or more users. Such user applications may include, e.g., personnel records, accounting, code development and compilation, mail, calendaring, or any of thousands of user applications. Some of these applications may access database data in a read-only manner, while others have the ability to update data. There may be many different types of read or write database access tasks, each accessing different data or requesting different operations on the data. For example, one task may access data from a specific, known record, and optionally update it, while another task may invoke a query, in which all records in the database are matched to some specified search criteria, data from the matched records being returned, and optionally updated. Furthermore, data may be read from or written to database 202 directly, or may require manipulation or combination with other data supplied by a user, obtained from another database, or some other source. Although two applications 214, 215 are shown for illustrative purposes in FIG. 2, the number of such applications may vary. Applications 214, 215 typically utilize function calls to database manager 211 to access data in database 202, and in particular, to execute queries to data in the database, although in some systems it may be possible to independently access data in database 202 directly from the application.

Various software entities are represented in FIG. 2 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 2, it will be understood that the actual number of such entities may vary, and in particular, that in a complex database server environment, the number and complexity of such entities is typically much larger. Additionally, although software components 202-207 and 211-215 are depicted in FIG. 2 on a single computer system 100 for completeness of the representation, it is not necessarily true that all programs, functions and data will be present on a single computer system or will be performed on a single computer system. For example, user applications may be on a separate system from the database; a database may be distributed among multiple computer systems, so that queries against the database are transmitted to remote systems for resolution, and so forth.

While the software components of FIG. 2 are shown conceptually as residing in memory 102, it will be understood that in general the memory of a computer system will be too small to hold all programs and data simultaneously, and that information is typically stored in data storage devices 125-127, comprising one or more mass storage devices such as rotating magnetic disk drives, and that the information is paged into memory by the operating system as required. In particular, database 202 is typically much too large to be loaded into memory, and typically only a small portion of the total number of database records is loaded into memory at any one time. The full database 202 is typically recorded in disk storage 125-127. Furthermore, it will be understood that the conceptual representation of FIG. 2 is not meant to imply any particular memory organizational model, and that system 100 might employ a single address space virtual memory, or might employ multiple virtual address spaces which overlap.

Figure 3:
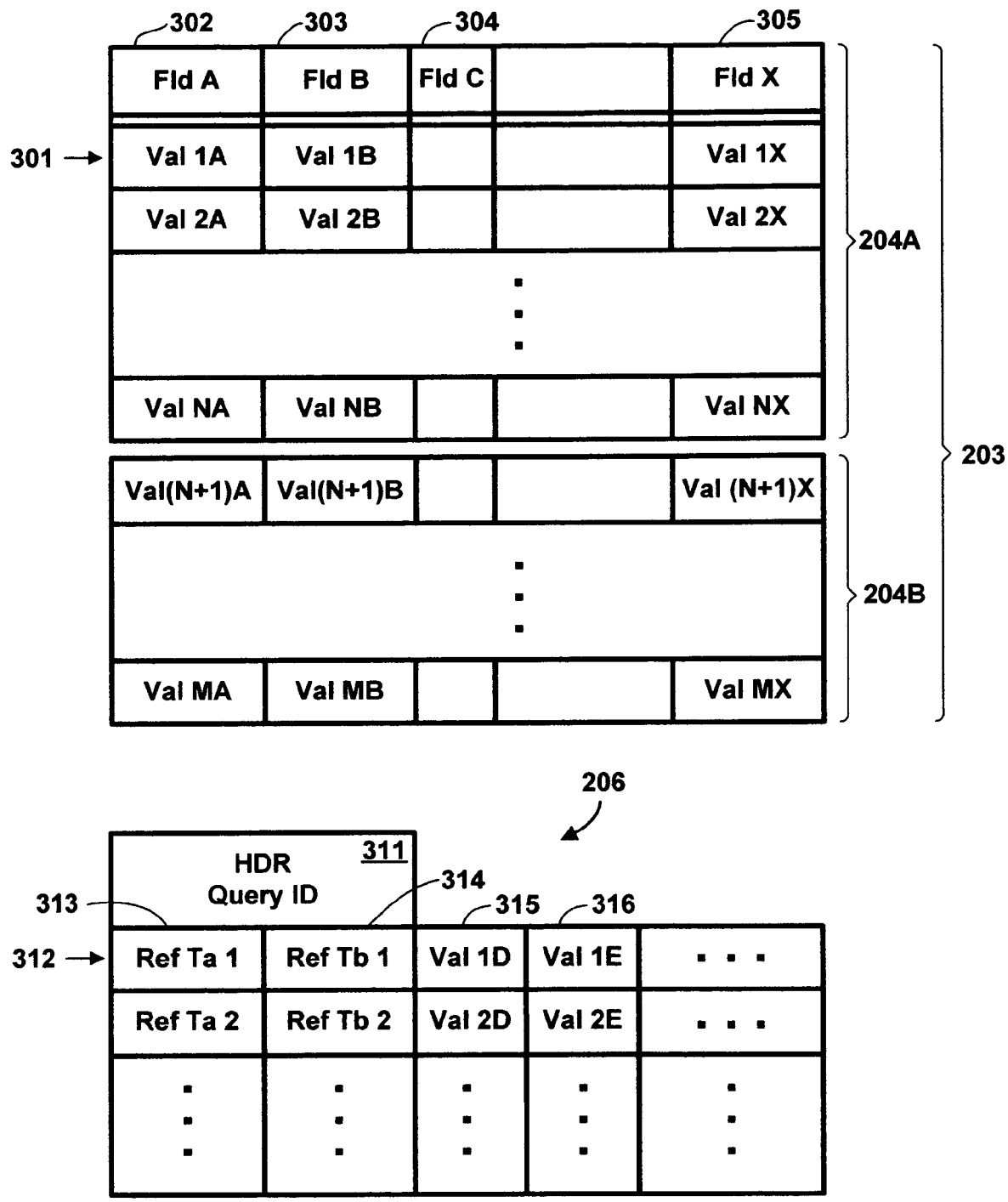
FIG. 3 is a conceptual representation of the structure of a database and materialized query table associated with a database, according to the preferred embodiment.

FIG. 3 is a conceptual representation of the structure of database table 203 and materialized query table 206 associated with database 202, according to the preferred embodiment. Database table 203 contains multiple database entries (also called records, or row) 301, each entry containing multiple data values logically organized as multiple data fields 302-305. Database table 203 is conceptually represented in FIG. 3 as a table or array, in which the rows represent database entries, and the columns represent data fields. However, as is well known in the art, the actual structure of the database in memory typically varies due to the needs of memory organization, accommodating database updates, and so forth. A database table will often occupy non-contiguous blocks of memory; database records may vary in length; some fields might be present in only a subset of the database records; and individual entries may be non-contiguous. Portions of the data may even be present on other computer systems. Various pointers, arrays, and other structures (not shown) may be required to identify the locations of different data contained in the database.

In some databases, a database table 203 is partitioned into multiple partitions or partitioned tables 204A, 204B, as represented in FIGS. 2 and 3. A partitioned table 204 contains a subset of the entries in the database table 203 of which it is a part. I.e., the partitioned table is conceptually a table containing exactly the same data fields 302-305 as the database table 203 of which it is a part, but containing only some of the entries (rows) of the whole table. Each partitioned table contains a discrete (i.e., non-overlapping) subset of the entries, the union of all the partitioned tables 204 constituting the entire database table 203. Each partitioned table 204 is itself a separate file, object or other data structure, although it is logically part of a larger table 203. Partitioned tables are often used because the volume of data in the whole table 203 is so large that including all of it in a single data structure violates some size constraint in the system, or simply becomes unwieldy, although a partitioned table may conceivably be used for other purposes.

Where table partitioning is used, there must be some method for allocating each entry to a respective one of the partitions. This may be accomplished by using some hash function of an address or record number, which will generally allocate an approximately equal number of records to each partition. However, it is often advantageous to allocate entries to partitions according to the value of some data field controlling the partitioning, because if a query should include a condition referencing that field, it may be known in advance that all of the responsive entries will be in a particular one of the partitioned tables (or some subset of the partitioned tables), thus reducing the scope of the records which must be examined to satisfy the query. In this case, the partitioned tables will not generally be the same size, and there may be substantial size differences. This data field controlling the partitioning might contain an ordered value, where ranges of the ordered value correspond to respective partition tables, or might contain one of multiple discrete values, each discrete value corresponding to a respective partitioned table. For example, in a database table of transactions maintained by a bank or similar financial institution, it may be desirable to partition the table by ranges of dates, such as calendar year or month. Because many queries against the database will be limited to some particular range of dates, it is possible to immediately narrow the scope of records examined by removing from consideration any records contained in a partitioned table corresponding to a date range outside the scope of the query.

One or more materialized query tables (MQT) 206 may be associated with database 202. A materialized query table is conceptually a table containing a header 311 which includes a query identifier for a defining logical query of database 202, and one or more entries (rows) 312 defined by the defining logical query. The query identifier is preferably a reference, such as an index number or pointer, referring to a query object containing a logical representation of the query, but the header could alternatively itself contain a logical query representation which actually defines the query conditions and is understandable by the query optimizer 212 and/or query engine 213. In the simple case where the defining query operates on a single database table 203, each row of the MQT represents an entry from that single database table which satisfies the conditions of the defining logical query. In the case of a defining query which joins a set of multiple database tables, each row of the MQT represents a set of entries from each of the set of multiple database tables joined by the query, the set of entries satisfying the conditions of the defining query. FIG. 3. represents an MQT in which the defining query is a logical join of two database tables Ta and Tb. Each row 312 of MQT 206 contains a single reference (such as a pointer) 313 to a corresponding row of table Ta and a single reference 314 to a corresponding row of table Tb. Together the pair of references to tables Ta and Tb within a single entry 312 of the MQT satisfy the conditions of the defining query. The row 312 preferably further contains selective fields 315, 316 from table Ta and/or table Tb, generally fewer than all fields of the two tables. The entries 312 within the MQT could alternatively contain only references 313, 314 to corresponding entries in the tables, without containing any field values 315, 316, or could contain copies of all of the data fields from the corresponding entries of tables Ta and Tb, or could contains the field values 315, 316 without references 313, 314. I.e., instead of or in addition to the value RefTa1, the MQT could contain all the actual data values within the row referenced by RefTa1 in table Ta. Techniques for generating and maintaining materialized query tables are known in the database art.

Figure 4:
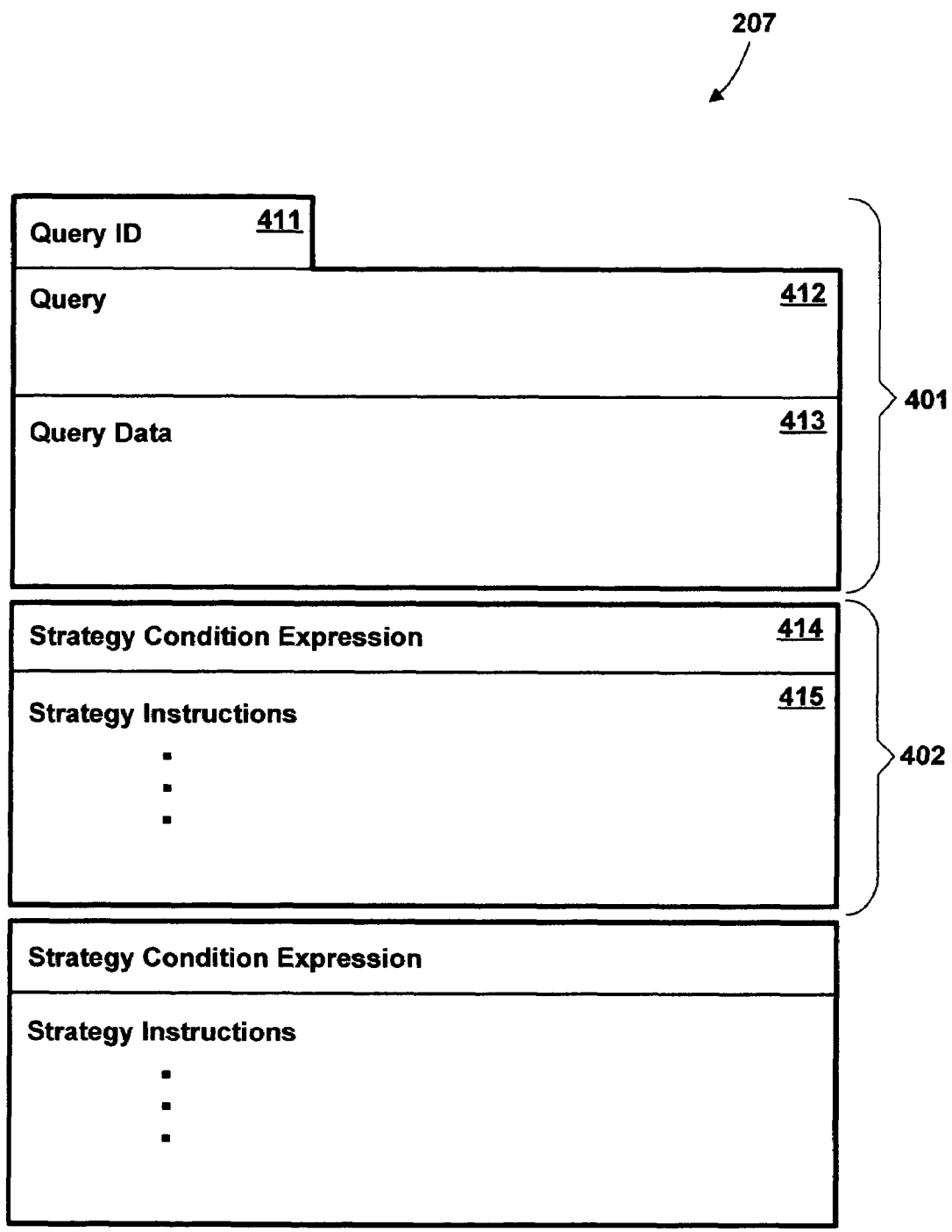
FIG. 4 is a conceptual representation of a persistent query object, according to the preferred embodiment.

FIG. 4 is a conceptual representation of a typical persistent query object 207, according to the preferred embodiment. A query object contains a body portion 401, and zero, one or multiple execution strategy blocks 402 (of which two are represented in the example of FIG. 4). The body portion contains a query identifier field 411, a query logical representation 412, and additional query data 413. The query logical representation 412 is a representation of the query in a form understandable by the query optimizer 212 and/or query engine 213, from which a query execution strategy can be constructed. Additional query data 413 includes various other data which might be useful to database management system 211 or other applications accessing a query. For example, additional data 413 might include a text description of the query, performance statistics for running the query, security and access control information, and so forth. Additional query data 413 is represented in FIG. 4 as a single block of data for clarity of illustration; however, such additional data will typically comprise multiple fields, some of which may be optional or of variable length, or may reference data in other data structures.

Execution strategy block 402 contains data relating to a particular execution strategy for the query. Because there may be multiple execution strategies for a single query, there may be multiple execution strategy blocks. In some cases, each of different execution strategies is a valid algorithm for satisfying the query, and will therefore produce identical sets of records which satisfy the query conditions. However, the resources required for executing the different strategies may vary greatly, and an appropriate strategy should be chosen. In other cases, a strategy may be optimized to use a subset of one or more database tables, so that it never looks at records outside that subset. Such a subset may be a partitioned table 204 or a materialized query table 206. In such cases, the strategy must only be used when it can be guaranteed that the query can be satisfied entirely within the corresponding database subset data structure, or query results will be compromised. Each strategy block 402 contains a query strategy condition expression 414, and a set of strategy instructions 415.

Strategy condition expression 414 is a logical expression specifying one or more conditions upon the use of the corresponding strategy. I.e., strategy condition expression is preferably a logical representation, similar to the query itself, containing one or more conditions joined by logical operators, such as AND or OR. In the preferred embodiment, the conditions relate specifically to the imported variable values from the query, although it would conceivably be possible to place additional conditions, unrelated to imported variable values, in the strategy condition expression. Each condition thus specifies a comparison of a particular imported variable. For example, the condition may specify that the imported variable be less than some constant value. A bounded range of imported variable values can be specified by including two conditions joined by a logical AND. An enumerated variable may contain a list of all permissible variable values joined by a logical OR. Strategy condition expression 414 may contain conditions relating to multiple imported variable values, and may contain conditions comparing imported variable values with one another.

Strategy instructions 415 are instructions for executing the corresponding strategy. In the preferred embodiment, these are not directly executable code, but are higher-level instructions which are interpreted by the query engine 213 to execute the query. These instructions determine whether or not indexes are used to search the database records and the order in which conditions are evaluated.

Among the functions supported by database management system 211 is the making of queries against data in database 202, which are executed by query engine 213. As is known, queries typically take the form of statements having a defined format, which test records in the database to find matches to some set of logical conditions. Typically, multiple terms, each expressing a logical condition, are connected by logical conjunctives such as "AND" and "OR". Because database 202 may be very large, having a very large number of records, and a query may be quite complex, involving multiple logical conditions, it can take some time for a query to be executed against the database, i.e., for all the necessary records to be reviewed and to determine which records, if any, match the conditions of the query.

The amount of time required to perform a complex query on a large database can vary greatly, depending on many factors. Depending on how the data is organized and indexed, and the conditions of the query, conditions may optimally be evaluated in a particular order, and certain auxiliary data structures such as indexes or materialized query tables may be used. Of particular interest herein, in the case of some queries using particular imported variable values, it may be desirable to execute the query using a database subset data structure. As used herein, a database subset data structure is a data structure which has a scope limited to only a subset of entries in a database table, the subset being non-null and including fewer than all the entries in the database table. Examples of database subset data structures are materialized query table 207 and partitioned table 204, although there may conceivably be other forms of database subset data structures, now known or hereafter developed, to which the techniques described herein would be applicable. The database subset data structure may contain all of the table information within this limited scope (as in the case of a partitioned table), or may contain only a part of the information (as is typically the case in an MQT). If it can be guaranteed that all entries in a database table which satisfy the query will be contained in some database subset data structure, then use of the database subset data structure to execute the query may result in a resource savings over some other execution strategy which potentially examines all the entries in the table. If, on the other hand, it can not be so guaranteed, then use of the database subset data structure could potentially produce inaccurate and incomplete results, corrupt data, and so forth. An execution strategy could reference multiple database subset data structures which are collectively still a subset (less than the whole database table), and the same principles apply. These and other considerations should be taken into account in selecting an optimum query execution strategy.

In accordance with the preferred embodiment, query engine 212 executes logical queries of database 202 using strategies generated by optimizer 212. A query may be saved, along with one or more strategies for its execution. The query engine therefore chooses an existing strategy for execution, or calls the optimizer to generate one. With each strategy, there may be associated a strategy condition expression as a condition on the use of that strategy. In particular, in the case of a strategy which employs a database subset data structure, a strategy condition expression prevents the use of the corresponding strategy if it can not be guaranteed in advance of executing the query that all responsive records will be contained in or referenced by the database subset data structure. At the time that a strategy employing a database subset data structure is created, the optimizer generates the strategy condition expression by logical manipulation of the query, as explained further herein. The strategy condition expression is saved with the execution strategy in an execution strategy block, and is checked by the query engine using the actual imported variable values of a new query before executing the new query.

Figure 5:
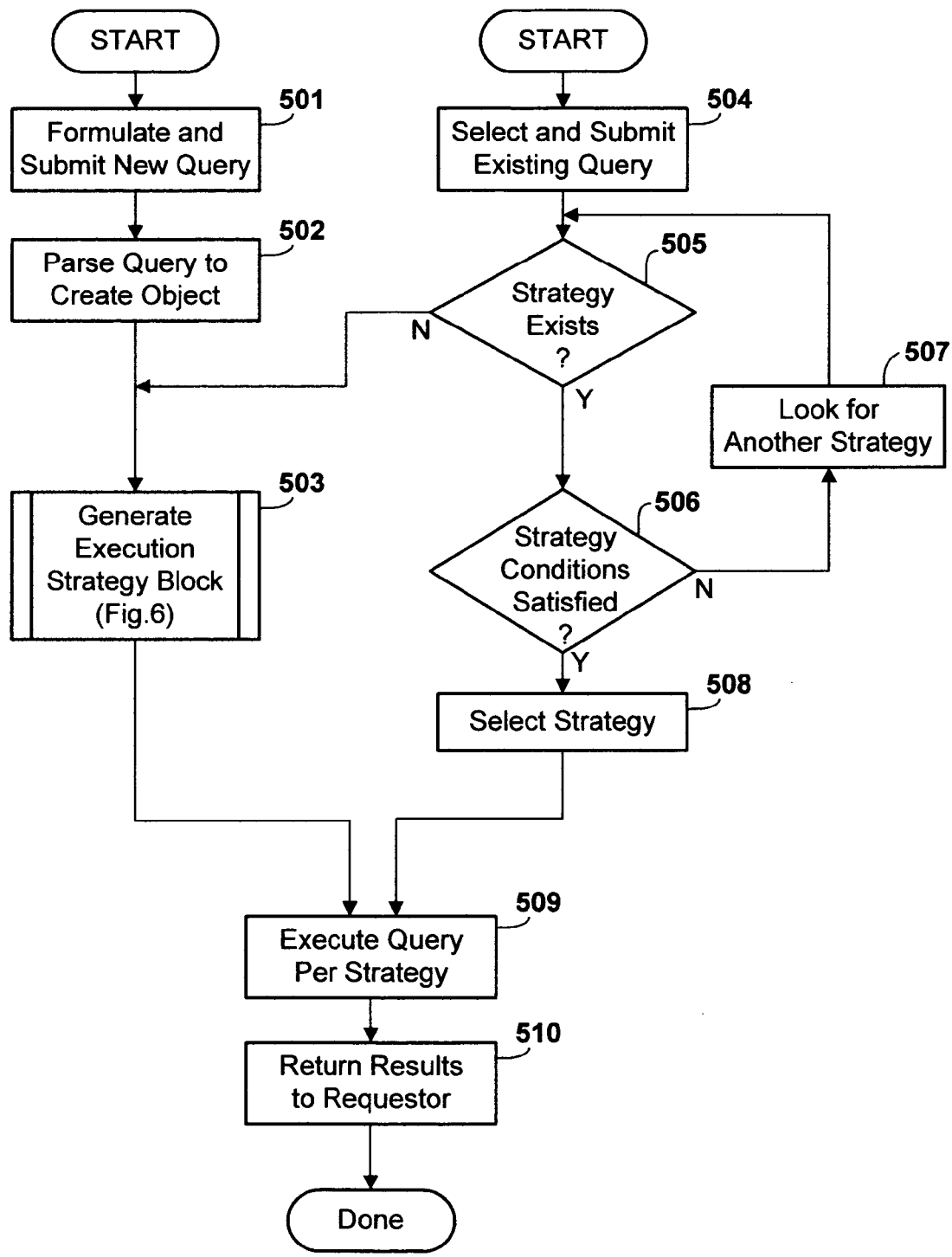
FIG. 5 is a flow diagram illustrating at a high level the process of executing a database query, according to the preferred embodiment.

FIG. 5 is a flow diagram illustrating at a high level the process of executing a database query, according to the preferred embodiment. Referring to FIG. 5, a query may be initiated either as a newly defined query, or as a re-used (previously executed and saved) query, as shown by the two paths beginning at blocks 501 and 504, respectively.

For a new query, a requesting user formulates and submits a database query using any of various techniques now known or hereafter developed (step 501). E.g., the database query might be constructed and submitted interactively using a query interface in database management system 211, might be submitted from a separate interactive query application program, or might be embedded in a user application and submitted by a call to the query engine 212 when the user application is executed. A query might be submitted from an application executing on system 100, or might be submitted from a remote application executing on a different computer system. In response to receiving the query, query engine 212 parses the query into logical conditions to generate a query object (step 502), which may be saved for re-use. The query engine invokes optimizer 212 to generate an optimized execution strategy block for the query. Generation of an optimized query execution strategy block is represented at a high level in FIG. 5 as step 503, and shown in greater detail in FIG. 6. Preferably, where this optimized strategy uses a database subset data structure, it includes conditions on the use of the subset, which are saved as a strategy block 402 with the query object, as described further herein with respect to FIG. 6. After generation of a suitable execution strategy at step 503, the database management system proceeds to step 509.

Where an existing query is re-used, a requesting user selects the existing query object for re-use and invokes it, using any of various techniques now known or hereafter developed (step 504). E.g., the query might be selected interactively from a menu in database management system 211, might be submitted from a separate interactive application program, or might be embedded in a user application and submitted by a call to the query engine 212 when the user application is executed, any of which might be performed from system 100, or from a remote system. In particular, for at least some queries, re-using an existing query may require specifying one or more imported variable values to be used in the query.

In response to invoking the query, query optimizer 212 determines whether a saved strategy exists in the query object 207 (step 505). If no such strategy exists (the 'N' branch from step 505), the query engine invokes the optimizer to generate one (step 503), as in the case of a new query. If a previously saved execution strategy exists for the query (the 'Y' branch from step 505), the database management system tests any logical conditions associated with the saved execution strategy for the query in the execution strategy block 402 (step 506). I.e., each execution strategy block may optionally contain a logical expression used to test whether that particular strategy can be used (where no condition is present, the logical expression is a boolean constant). These expressions are evaluated with respect to known parameters of the instance of the query to be executed. In particular, these expressions are evaluated with respect to any imported variable values for the query to be executed. If the saved execution strategy does not meet the logical test, then the 'N' branch is taken from step 506, and the database management system looks for another previously saved execution strategy (step 507), continuing then to step 505. The database management system continues to look for execution strategies (loop at steps 505-507) until a strategy is found which meets its logical test (the 'Y' branch from step 506) or there are no more strategies (the 'N' branch from step 505).

If at least one execution strategy exists for which its logical conditions are satisfied, the 'Y' branch is taken from step 506, and an execution strategy is selected (step 508). Where multiple execution strategies are permissible (multiple strategies satisfy their respective logical conditions), the database manager will choose one of these multiple strategies. Such a choice could be based on priorities, or any criteria or technique now known or hereafter developed, or could be arbitrary. After selecting a strategy, the database management system proceeds to step 509.

The query engine is then invoked to execute the query according to the query execution strategy which was either generated at step 503 or selected at step 508 (step 509). Generally, this means that the query engine retrieves selective database records according to the query execution strategy, and evaluates the logical query conditions with respect to the selected record in an order determined by the strategy, using any known technique or technique hereafter developed. E.g., for a conjunction of logical ANDs, each successive condition is evaluated until a condition returns "false" (which obviates the need to evaluate any further conditions) or until all conditions are evaluated.

The query engine then generates and returns results in an appropriate form (step 510). E.g., where a user issues an interactive query, this typically means returning a list of matching database entries for display to the user. A query from an application program may perform some other function with respect to database entries matching a query.

Figure 6:
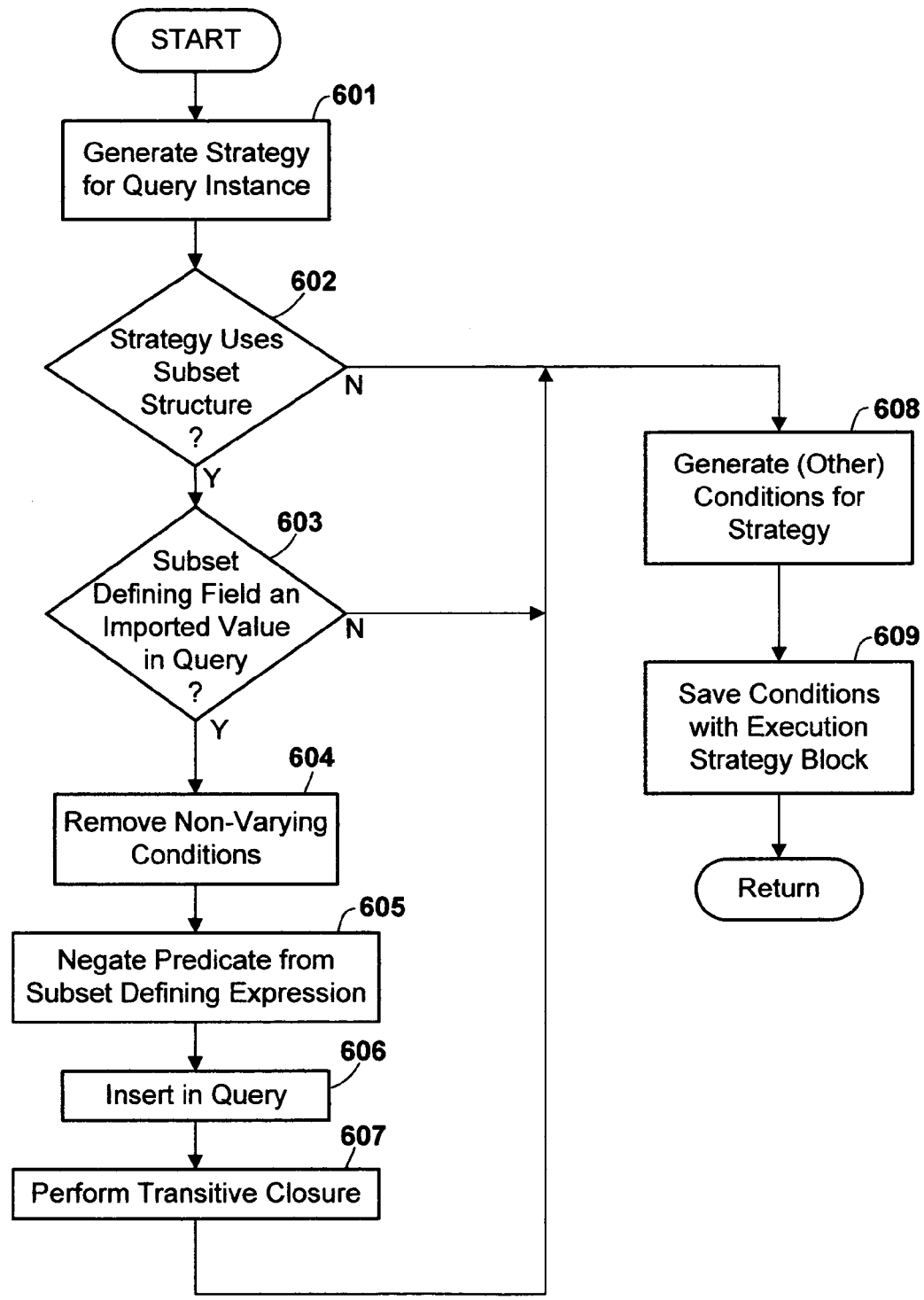
FIG. 6 shows in greater detail the process of generating a query execution strategy and conditions for its use, according to the preferred embodiment.

FIG. 6 shows in greater detail the process of generating a query execution strategy and conditions for its use, according to the preferred embodiment, represented in FIG. 5 as step 503. Referring to FIG. 6, the optimizer is invoked and generates an optimized query execution strategy for the current query (step 601). Specifically, this strategy is optimized for the current query using the current instances of any imported variables which are passed with the query (and not necessarily optimized for all possible values of such imported variables). The query optimizer may use any technique, now known or hereafter developed, for determining an optimum query execution strategy, and may employ any of the auxiliary data structures available in the database, may use partitioned database tables to the extent they exist, and/or any other appropriate query execution technique in the optimum strategy. Various techniques for generating a query execution strategy for a given query instance are known in the art.

If the execution strategy generated at step 601 employs a database subset data structure, then the 'Y' branch is taken from step 602 to step 603. If the execution strategy does not employ a database subset data structure, then steps 603-607 are by-passed, and the optimizer proceeds directly to step 608 to consider whether any other conditions should be attached to use of the strategy.

The subset logical definition is then examined for the presence of any database fields which correspond to imported variables in the query being optimized for execution (step 603) A database subset data structure has associated with it some rule, referred to herein as the subset definition expression, which defines which records in the database are included in the database subset data structure. In the case of a partitioned table, this subset definition expression is generally a condition on a value of a single database field in the table of which the partitioned table is a part. E.g., a table containing a field "FldA", where FldA is an ordered value, might contain a partition having the subset definition:

$$C1 < FldA \text{ AND } FldA \leq C2, \tag{1}$$

where C1 and C2 are constants. The partitioned table defined by this expression will contain all database table entries for which FldA fall within the prescribed range, and all other database table entries having a value of FldA outside the range will be in some other partitioned table. In the case of a materialized query table, the subset definition expression is a logical query, which can have an arbitrary degree of complexity, and can reference multiple database fields from a single database table or from multiple tables. For example, an MQT table may be created to join a transaction table (Trans) with an account table (Acct) and contain data associated with both, including a value computed from database fields such as total priced (quantity*price) for each transaction, according to the following query (subset definition expression):

SELECT A.aid, T.fpgid, A.status, T.qty, T.price,
　　T.disc, t.qty*t.price as value FROM Trans T, Acct A WHERE T.faid=A.aid AND T.disc>0.1　　　　　　　　　　　　　　　　　(2)

If the query being optimized contains any imported variables corresponding to fields used to define the subset, the 'Y' branch is taken from step 603, else steps 604-607 are bypassed. For example, in the case of the partitioned table defined by expression (1) above, if FldA is compared to an imported value in a query condition, then the 'Y' branch would be taken from step 603. Similarly, in the case of the MQT defined by expression (2) above, if any of T.faid, A.aid or T.disc is compared to an imported value in a query condition, then the 'Y' branch would be taken from step 603.

The optimizer then logically manipulates the subset definition expression and the query being optimized to produce a logical test for using the query execution strategy generated at step 601, which can be applied to any future re-use of the query with any arbitrary set of imported variable values. This process is shown generally in steps 604-607, and can best be understood by reference to the following simple example. It is assumed that the database contains an MQT defined by the subset definition expression (2) above. The optimizer is required to generated a strategy for the following query:

SELECT A.aid, A.status, T.qty*T.price *(1−T.disc) as amt

FROM Trans T, Pgroup P, Acct A

WHERE P.pgid=T.fpgid and T.faid=A.aid

AND T.price>:H1 AND T.disc≧:H2 AND T.disc≦: H3

AND P.pgname=:H4  (3)

In this example query, :H1, :H2, :H3 and :H4 are imported variables. It is further assumed that, for the instance of the query being optimized, the imported values of :H2 and :H3 are 0.2 and 0.7, respectively. If the values 0.2 and 0.7 are substituted for :H2 and :H3 in query (3), it will be observed that the query's condition on the field T.disc (0.2≦T.disc≦0.7) is contained within the corresponding condition subset definition expression (2) above for an MQT, (i.e., T.disc>0.1). For these particular imported variable values, any pair of records from tables Trans T and Acct A which satisfies the conditions of the query being optimized will also be contained in the MQT defined by expression (2). It is therefore assumed for purposes of this example that the optimizer constructs a strategy at step 601 which employs the MQT defined by expression (2).

This strategy will produce a valid result for any instance of query (3) for which it can be guaranteed that any pair of records from tables Trans A and Acct A which satisfies the query instance will also be contained in the MQT. If, however, the values of :H2 and :H3 are such that this condition can not be guaranteed, then a query execution strategy using the MQT defined by expression (2) can not be guaranteed to produce correct results. For example, if :H2 is 0 and :H3 is 0.3, then there could be some pair of records from tables Trans A and Acct A which satisfy all the conditions of the query, but are not contained in the MQT because the value of the field T.disc≦0.1.

To generate the logical test to be associated with the query execution strategy (which uses a database subset data structure), the optimizer begins with the part of the definition expression which defines the range of the database subset (e.g., in the example of MQT query (2), the predicate following "WHERE"), and removes any conditions relating to fields which are not imported variables in the query, (step 604). The reason these conditions can safely be removed is that, if no imported variables are involved, then satisfaction of this condition was already verified when the query was originally optimized. These are removed immediately to simplify the logical manipulations performed in later steps, although theoretically it would be possible to skip step 604, and the manipulations performed by subsequent steps would ultimately simplify to the same result. In the case of the example query (2), the defining predicate:

T.faid=A.aid AND T.disc>0.1 is simplified to:

T.disc>0.1.

The optimizer then negates the predicate from the previous step (step 605). In the example, this results in negation of the predicate: "T.disc>0.1", which produces the condition "T.disc≦0.1".

The negated predicate is then inserted into the corresponding conditions of the query being optimized (step 606), i.e. into those conditions which define the range of the selected field. In the example, the query conditions relating to the selected field are:

T.disc≧:H2 AND T.disc≦:H3

Inserting the negated predicate from the subset definition expression produces:

T.disc≧:H2 AND T.disc≦0.1 AND

T.disc≦0.1 AND T.disc≦:H3.

The optimizer then performs transitive closure on the expressions thus produced to remove the selected field and reduce the complexity of the expression (step 607). In the example, the expression:

T.disc≧:H2 AND T.disc≦0.1 is reduced by transitive closure to:

:H2≦0.1.

The expression:

T.disc≦0.1 AND T.disc≦:H3 cannot be transitively closed so it is assumed to be always true. The expression therefore reduced to :H2≦0.1 AND TRUE, which is the same as:

:H2≦0.1.

The expression produced by step 607 is the logical test for using the query execution strategy. This test is in a negated form, i.e., if the test evaluates to TRUE, then the corresponding query execution strategy should not be used (and vice versa). The expression could alternatively be negated again as a final step (not shown) to produce an expression which evaluates to TRUE when the query execution strategy may be used and FALSE when it should not. The optimizer then proceeds to step 608.

At step 608, the optimizer may optionally generate other and additional conditions (unrelated to those created by steps 604-607) on the use of the query execution strategy. For example, other conditions may limit the use of the strategy according to other field values (which do not define a database subset data structure), or even based on assumptions about system configuration or other factors. The optimizer then generates and saves an execution strategy block 402 for inclusion in the query object, the execution strategy block containing any conditions on the use of the query strategy constructed as described herein (step 609).

Among the advantages of the technique described herein as a preferred embodiment is the relatively low overhead of implementation, and the fact that it can be used in conjunction with, and does not foreclose the use of, other independent techniques for choosing an optimum query execution strategy. The technique described herein merely associates a logical condition with certain query execution strategies, which, if not met, means that the strategy cannot be used because results will be unreliable. It does not necessarily require that a particular strategy be used if the logical condition is met, and as explained above there could be other conditions or priorities on the use of a strategy. However, the presence of a logical test permits wider use of database subset data structures in query execution strategies, by allowing these strategies to be re-used in at least some circumstances where the imported variable values have changed.

In the preferred embodiment described above, the generation and execution of the query is described as a series of steps in a particular order. However, it will be recognized by those skilled in the art that the order of performing certain steps may vary, and that variations in addition to those specifically mentioned above exist in the way particular steps might be performed. In particular, the manner in which queries are written, parsed or compiled, and stored, may vary depending on the database environment and other factors. Furthermore, it may be possible to present the user with intermediate results during the evaluation phase.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network, including a wireless network. Examples of signal-bearing media are illustrated in FIG. 1 as system memory 102, and as data storage devices 125-127.

Although a specific embodiment of the invention has been disclosed along with certain alternatives, it will be recognized by those skilled in the art that additional variations in form and detail may be made within the scope of the following claims:

What is claimed is:

1. A method for executing a database query in a computer system, comprising the steps of:

automatically generating a re-usable query execution strategy for a database query, said database query containing at least one condition comparing a first database field to an imported variable value, said re-usable query execution strategy employing a database subset data structure containing data from a subset of records in said database, said subset having a scope defined with reference to said first database field, said re-usable query execution strategy being re-usable for multiple execution invocations of said database query, each execution invocation including a respective instance of said imported variable value;

automatically generating a query execution strategy condition expression associated with said re-usable query execution strategy, said query execution strategy condition expression expressing at least one condition on use of said query execution strategy, said at least one condition limiting said imported variable value to a range of values in which said at least one condition of said query is within a scope of said database subset data structure, wherein said step of automatically generating a query execution strategy condition expression comprises:

negating a predicate referencing said first database field contained in a subset definition expression defining the scope of said database subset data structure, inserting said negated predicate into said at least one condition of said query comparing a first database field to an imported variable value, and performing a transitive closure of the expression resulting from said inserting step, wherein said database subset data structure comprises data joined from a plurality of database tables;

invoking said database query including a first instance of said imported variable value;

evaluating said query execution strategy condition expression using said first instance of said imported variable value; and using said query execution strategy to execute said database query including said first instance of said imported variable value depending on results of said evaluating step.

2. The method for executing a database query of claim 1, further comprising the step of:

invoking said database query including a second instance of said imported variable different from said first instance, said step of invoking said database query including a second instance of said imported variable being performed before said step of automatically generating a query execution strategy;

wherein said step of automatically generating a query execution strategy is performed responsive to said step of invoking said database query including a second instance of said imported variable.

3. The method for executing a database query of claim 1, wherein said database subset data structure is a materialized query table.

4. The method for executing a database query of claim 1, wherein said database subset data structure is a partitioned table.

5. A computer program product stored in a computer readable storage media for database query optimization comprising:

a plurality of computer executable instructions recorded on the computer-readable storage media, wherein said instructions, when executed by at least one computer system, cause the at least one computer system to perform the steps of:

generating a re-usable query execution strategy for a database query, said database query containing at least one condition comparing a first database field to an imported variable value, said re-usable query execution strategy being re-usable for multiple execution invocations of said database query, each execution invocation including a respective instance of said imported variable value;

generating a query execution strategy condition expression associated with said query execution strategy, said query execution strategy condition expression expressing at least one condition on the use of said query execution strategy, said at least one condition of said query execution strategy condition expression referencing said imported variable value, said at least one condition of said query execution strategy condition expression being generated by:

(a) negating a predicate referencing said first database field contained in a logical expression defining an applicability of said query execution strategy, (b) inserting said negated predicate into said at least one condition of said query comparing a first database field to an imported variable value, and (c) performing a transitive closure of the expression resulting from said inserting step;

receiving an invocation of said database query including a first instance of said imported variable value;

evaluating said query execution strategy condition expression using said first instance of said imported variable value; and using said query execution strategy to execute said database query including said first instance of said imported variable value depending on results of said evaluating step;

wherein logical expression defining an applicability of said query execution strategy comprises a logical expression defining a scope of a database subset data structure employed by said query execution strategy;

wherein said database subset data structure comprises data joined from a plurality of database tables.

6. The computer program product of claim 5, wherein said database subset data structure is a materialized query table.

7. The computer program product of claim 5, wherein said database subset data structure is a partitioned table.

8. The computer program product of claim 5, wherein said instructions, when executed by said at least one computer system, further cause the at least one computer system to perform the steps of:

receiving an invocation of said database query including a second instance of said imported variable different from said first instance, said step of receiving an invocation of said database query including a second instance of said imported variable being performed before said step of generating a query execution strategy;

wherein said step of generating a query execution strategy is performed responsive to said step of receiving an invocation of said database query including a second instance of said imported variable.

9. A computer system, comprising:

at least one processor;

a data storage for storing a database, wherein said database contains a plurality of database tables, and a database subset data structure comprises data joined from at least two of said database tables;

a database management facility embodied as a plurality of instructions executable on said at least one processor, said database management facility including a query engine which executes logical queries against said database and a query optimizer for generating execution strategies for executing logical queries against said database;

wherein a first execution strategy generated by said query optimizer for a first logical query contains at least one condition comparing a first database field of said database to an imported variable value, said first execution strategy employing a database subset data structure containing data from a subset of records in said database, said subset having a scope defined with reference to said first database field, said first execution strategy being re-usable for multiple execution invocations of said database query, each execution invocation including a respective instance of said imported variable value;

wherein said database management facility automatically generates a query execution strategy condition expression associated with said first execution strategy, said query execution strategy condition expression expressing at least one condition on use of said first execution strategy, said at least one condition limiting said imported variable value to a range of values in which said at least one condition of said query is within scope of said database subset data structure, wherein said database management facility automatically generates said query execution strategy condition expression by:

negating a predicate referencing said first database field contained in a subset definition expression defining the score of said database subset data structure; inserting said negated predicate into said at least one condition of said query comparing a first database field to an imported variable value; and performing a transitive closure of the expression resulting from said inserting step; and wherein, responsive to invoking said first database query including a first instance of said imported variable value, said database management facility evaluates said query execution strategy condition expression using said first instance of said imported variable value; and uses said first execution strategy to execute said first database query including said first instance of said imported variable value depending on results of evaluation.

10. The computer system of claim 9, wherein said first execution strategy and said query execution strategy condition expression are generated responsive to invoking said first database query including a second instance of said imported variable value different from said first instance.

11. The computer system of claim 9, wherein said database subset data structure is a materialized query table.

12. The computer system of claim 9, wherein said database subset data structure is a partitioned table.

* * * * *